(12) United States Patent
Axelsson et al.

(10) Patent No.: US 8,553,560 B2
(45) Date of Patent: Oct. 8, 2013

(54) PREDICTIVE AD-HOC NETWORK ROUTING

(75) Inventors: Leif Axelsson, Hovås (SE); Yoshio Honda, Tokyo (JP); Kenzo Urabe, Kanagawa (JP); Toshikane Oda, Tokyo (JP)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 861 days.

(21) Appl. No.: 10/584,290

(22) PCT Filed: Dec. 23, 2003

(86) PCT No.: PCT/SE03/02074
§ 371 (c)(1),
(2), (4) Date: Jun. 4, 2007

(87) PCT Pub. No.: WO2005/062552
PCT Pub. Date: Jul. 7, 2005

(65) Prior Publication Data
US 2007/0274268 A1    Nov. 29, 2007

(51) Int. Cl.
*H04L 12/26*    (2006.01)
(52) U.S. Cl.
USPC ............ 370/238; 370/236; 370/232; 370/233; 370/356; 370/355; 455/418; 455/421; 455/445; 455/436; 455/432.1
(58) Field of Classification Search
USPC ............ 455/422.1, 432.1, 433, 436, 437, 445, 455/517, 453, 509, 418–420; 370/225, 228, 370/229, 231, 235, 238, 400, 236, 252, 254, 370/255, 331, 349, 392, 351, 233, 232, 355, 370/356, 338, 328, 329, 437, 332; 709/232, 709/234, 235, 238, 239
See application file for complete search history.

(56) References Cited

U.S. PATENT DOCUMENTS

| | | | |
|---|---|---|---|
| 5,537,394 | A | 7/1996 | Abe et al. |
| 6,556,824 | B1 | 4/2003 | Purnadi et al. |
| 6,678,252 | B1 | 1/2004 | Cansever |
| 6,763,014 | B2 * | 7/2004 | Kennedy ........................ 370/338 |

(Continued)

FOREIGN PATENT DOCUMENTS

| | | |
|---|---|---|
| JP | 2004-282270 | 10/2004 |
| JP | 2004-336767 | 11/2004 |

(Continued)

OTHER PUBLICATIONS

International Search Report for PCT/SE03/02074, dated Jul. 13, 2004.

(Continued)

*Primary Examiner* — Vladimir Magloire
*Assistant Examiner* — Babar Sarwar
(74) *Attorney, Agent, or Firm* — Nixon & Vanderhye P.C.

(57) ABSTRACT

A system for efficient routing in a multiple hop wireless communication network comprising a plurality of network nodes is presented. The system acquires quality information indicating link status between the infrastructure nodes. The link quality information is used in a route determination process in the infrastructure nodes using a predictive procedure. The link quality information includes information about a time varying information of the link status. The predictive procedure uses the time varying information of link status, and a router data packets according to the determined route.

41 Claims, 8 Drawing Sheets

(56) References Cited

U.S. PATENT DOCUMENTS

| | | | |
|---|---|---|---|
| 6,804,532 | B1 | 10/2004 | Moon et al. |
| 6,879,806 | B2 | 4/2005 | Shorty |
| 6,954,435 | B2 | 10/2005 | Billhartz et al. |
| 7,002,917 | B1 | 2/2006 | Saleh |
| 7,177,295 | B1 | 2/2007 | Sholander et al. |
| 7,266,085 | B2 | 9/2007 | Stine |
| 7,280,545 | B1 | 10/2007 | Nagle |
| 7,373,543 | B1 | 5/2008 | Jain et al. |
| 2002/0027896 | A1 | 3/2002 | Hughes et al. |
| 2002/0071395 | A1* | 6/2002 | Redi et al. ............. 370/252 |
| 2003/0048782 | A1 | 3/2003 | Rogers et al. |
| 2003/0053412 | A1 | 3/2003 | Yoshida et al. |
| 2003/0120789 | A1 | 6/2003 | Hepworth et al. |
| 2003/0120809 | A1 | 6/2003 | Bellur et al. |
| 2003/0179742 | A1 | 9/2003 | Ogier et al. |
| 2003/0191856 | A1 | 10/2003 | Lewis et al. |
| 2003/0202476 | A1 | 10/2003 | Billhartz et al. |
| 2003/0204587 | A1 | 10/2003 | Billhartz |
| 2004/0008794 | A1 | 1/2004 | McClellan |
| 2004/0022223 | A1 | 2/2004 | Billhartz |
| 2004/0027994 | A1 | 2/2004 | Baines |
| 2004/0042418 | A1 | 3/2004 | Hamada et al. |
| 2004/0160943 | A1 | 8/2004 | Cain |
| 2004/0213229 | A1 | 10/2004 | Chang et al. |
| 2004/0219909 | A1 | 11/2004 | Kennedy et al. |
| 2005/0053007 | A1 | 3/2005 | Bernhardt et al. |
| 2007/0263628 | A1 | 11/2007 | Axelsson et al. |
| 2008/0037477 | A1 | 2/2008 | Axelsson et al. |
| 2008/0048883 | A1 | 2/2008 | Boaz |
| 2012/0063396 | A1* | 3/2012 | Rayment et al. ............. 370/329 |

FOREIGN PATENT DOCUMENTS

| | | |
|---|---|---|
| WO | 02/078229 | 10/2002 |
| WO | 02/084956 | 10/2002 |
| WO | WO 03/015452 | 2/2003 |
| WO | 03/071751 | 8/2003 |
| WO | 03/093926 | 11/2003 |
| WO | 03/094028 | 11/2003 |
| WO | WO 03/093927 | 11/2003 |
| WO | 2004/030258 | 4/2004 |
| WO | WO 2004/030258 | 4/2004 |
| WO | 2005/041533 A1 | 5/2005 |

OTHER PUBLICATIONS

Translation of Chinese official action, May 22, 2009, in corresponding Chinese Application No, 200380110899.2.

Summary of Japanese official action, Aug. 31, 2009, in corresponding Japanese Application No. 2005-512361.

Translation of Chinese official action, Aug. 4, 2010, in corresponding Chinese Application No. 2008/80110899.2.

Office Action mailed Feb. 15, 2011 in co-pending U.S. Appl. No. 10/584,135.

Office Action mailed Feb. 15, 2011 in co-pending U.S. Appl. No. 10/584,136.

Office Action mailed Sep. 27, 2010 in co-pending U.S. Appl. No. 10/584,136.

Office Action mailed Nov. 8, 2010 in co-pending U.S. Appl. No. 10/584,135.

Belrose, "Fessenden and Marconi: Their Differing Technologies and Transatlantic Experiments During the First Decade of this Century", Radio's First Message, International Conference on 100 Years of Radio, Sep. 5-7, 1995.

Chen et al,. *Distributed Quality-of-Service Routing in Ad Hoc Networks*, IEEE Journal on Selected Areas in Communications, Aug. 1999, vol. 17, No. 8, 1488-1505.

Raju et al., *Quality of Service Routing in Ad Hoc Networks*, IEEE, Division of Engineering, Sep. 23, 2000, pp. 263-265.

Office Action mailed Feb. 19, 2009 in related U.S. Appl. No. 10/584,135 (17 pages).

Office Action mailed Sep. 1, 2009 in related U.S. Appl. No. 10/584,135 (17 pages).

Office Action mailed Dec. 30, 2009 in related U.S. Appl. No. 10/584,135 (26 pages).

Office Action mailed May 11, 2010 in related U.S. Appl. No. 10/584,135 (26 pages).

International Search Report for PCT/SE2003/002080 dated Jul. 13, 2004 (3 pages).

Office Action mailed Oct. 29, 2009 in related U.S. Appl. No. 10/584,136 (9 pages).

Office Action mailed Apr. 26, 2010 in related U.S. Appl. No. 10/584,136 (11 pages).

* cited by examiner

PREDICTIVE AD-HOC NETWORK ROUTING

This application is the US national phase of international application PCT/SE2003/002074 filed 23 Dec. 2003, which designated the U.S., the entire contents of each of which are hereby incorporated by reference.

FIELD OF INVENTION

The present invention relates to a routing system, method and apparatus, in particular for an ad hoc based network in a mobile or static environment using a predictive routing model.

BACKGROUND

Wireless communication between mobile users is becoming more and more popular as devices and technology is developed. The infrastructure roll out is expanding within both telecom systems and data network systems. Today also the telecom systems are increasingly using packet switched networks and the trend is clear towards this scheme of packet based routing. This system has been used for many years in the data network based systems and thus many standardized routing protocols exist for this purpose. However they are not prepared for rapidly changing network topographies like for instance so called ad hoc networks.

Wireless ad hoc networks do not have the same static nature as an ordinary wired network infrastructure, do not have a centralized control, and are often created in a spontaneous manner. Control is maintained through a decentralized concept. Nodes can be connected or disconnected in an uncontrolled manner as compared to standard fixed network architectures; the nodes may come and go quickly which leads to a dynamically changing network topology. In some cases such ad hoc networks are formed by user/client devices themselves as infrastructure components. These components are then truly mobile in the sense that the users move around, in and out of a network cell, and therefore the infrastructure will move around accordingly. This is an exciting way of building an infrastructure but it sets very high demands on the routing protocol.

Other problems in a wireless environment are due to radio specific questions that will degrade the performance and efficiency of the network flow. There may be fading problems due to the movement of infrastructure nodes or movement of objects in the radio environment, and there may be problems due to interference from other radio sources within range.

These kinds of network topographies have been used in the military environment but are now migrating into the civilian area as well. Wireless systems are now used to rapidly build infrastructure areas for, e.g. wireless broadband access in residential areas or commercial areas. It may be used for temporary infrastructure build up, for example in an emergency situation, in a disaster area, or on the battlefield for military purposes. It could also be used to build up temporary access coverage areas during events like, for example, concerts, conferences, meetings, or seasonal tourist areas. In these kinds of areas, it is not necessary to have coverage all year around but only during specific periods.

Today, several Internet Service Providers (ISP) offers wireless access at public or semi-public areas such as airports, restaurants, coffee shops, and hotels using fixed wireless infrastructure systems. These systems are often referred to as so called hotspots.

As the demand from the users to gain access increases considering coverage and bandwidth, one way of expanding the area of wireless coverage or bandwidth is to install more infrastructure components, however doing this with normal fixed wireless components are expensive and thus the idea to build networks using wireless routers has emerged. In this case ad hoc routing protocols may be used to have a simplified installation procedure.

There are basically two kinds of network usages when discussing ad hoc networks; the first one is the build up of a local area network without any external gateway providing access to an external network, for example Internet. This scheme may be found in installations concerning disaster areas or military installations on the battlefield. The other and probably more common usage is when one or several gateways provide the network with external connections to, for example, an IP based network (private or public, e.g. Internet). In such a network configuration, data packets may take different routes and/or use different gateways depending on, for example, the data traffic type, congestions, or routing cost.

Packet based routing schemes often build there communication network systems around a layered model, for instance the OSI reference model. The communication software or hardware is divided into several smaller sub units, layers, working in a hierarchical manner. Information and communication control parameters are passed up and down locally and between the same layers between the sending and receiving ends. Each such layer is responsible for different tasks in the communication order. In respect to routing the first three layers according to the OSI reference model are the most important.

Layer 1 is responsible for the physical transmission of bits of data; examples of physical means may be, for instance, the wired link in an Ethernet based network or a wireless link in a Wireless Local Area Network (WLAN).

Layer 2 is often called the Link layer or the MAC layer and is responsible of transmitting chunks of data, error detection, and network resource coordination.

Layer 3 is often called the Network layer; it is responsible for enabling communication between any pair of nodes in a network. This layer takes, for example, care of routing calculations and congestion control. For this purpose different routing protocols has been developed depending on the type of network.

Packet routing protocols in the IP-based networks are generally based on routing algorithms using distance vector or link state information to find and maintain a route for each pair of source and destination nodes in the network. In principle, in the distance vector routing algorithms, each router broadcasts the distance to all hosts to its neighbor routers, and each router receiving the information calculates the shortest route to each of the hosts in the network. In the link-state routing algorithms, each router broadcasts the status information of each of its adjacent network links to its neighbor routers, and each router receiving the information maintains the database of the entire picture of the network from the link status information and calculates the shortest route to each host based on the link costs in the database. These routing algorithms are designed for relatively static networks and thus new routing algorithms must be designed for ad hoc networks whose topology changes frequently.

There are basically two categories of existing routing protocols for ad hoc networks. These are "proactive" (table driven) and "reactive" (on-demand) routing protocols. Protocols having combinations of these protocols are also possible.

Proactive routing protocols constantly and periodically calculate a route to all hosts in the ad hoc network, and thus a route is always available when a packet needs to be sent to a particular destination host. The results are kept in routing tables in all nodes.

In order to maintain routes to each host, control messages are exchanged among the routers to notify changes of the network configuration and link status. Distance vector and link state routing protocols are both categorized as proactive protocols. It should be noted that control messages lead to overhead and may result in reduced network efficiency. Also, the proactive protocols may have difficulty in maintaining valid routes when the network topology changes frequently.

DSDV (Destination-Sequenced Distance Vector Routing) is a proactive routing protocol based on the distance vector algorithm, adapting the Routing Information Protocol (RIP) to ad hoc networks. Each node maintains a routing table in which the node stores the next hop node and hop count to each of all the reachable destination hosts. In DSDV, each node broadcasts or multicasts routing updates periodically, or when it detects changes of the network topology. Incremental updates, which update only information about changes since the last update, are also used in order to reduce control traffic.

A reactive protocol only performs control message exchange to find/update a route when there is a data packet to be sent. When a source node wants to send data packets, it initiates the control protocol to find a route by sending a route request message to its neighbor nodes. By this principle, the reactive approach is good in that network resources are not wasted when there are no packets to be transported. However, it takes longer time to send packets when a route has to be formed for the first time. AODV and DSR are representative reactive protocols.

AODV (Ad hoc On-Demand Distance Vector Routing) protocol uses the DSDV algorithm and creates/updates routes on an on-demand basis, that is, only when a source node wants to send a data packet. This leads to reduction of the number of required broadcasts for finding/updating a route.

In AODV, each node maintains a list of detected neighbor nodes. The neighbor list is updated in one of the following three ways: a) when a packet is received from the neighbor node, b) by receiving local advertisement, that is, hello message, from the neighbor node, or c) through feedback from the link layer. Hello messages are broadcasted periodically from each node to its neighboring nodes to inform them about its presence.

In AODV, each node maintains a routing table for all the destinations, each of which the node is either communicating with or forwarding data packets to on behalf of other nodes. For each destination, there is an entry in the routing table that contains information about the destination, such as the IP address, the sequence number for the destination node, hop count to the destination, the next hop node to the destination, and lifetime for the route.

When a node wants to communicate with a destination node, that is, to send data packets to the destination, then the source node initiates a route discovery mechanism, where the source node broadcasts a route request (RREQ) to all detected neighbor nodes. When the neighbor node receives the RREQ message and has the entry for a fresh enough route to that destination in its routing table, then it sends back a route reply (RREP) message to the source node. If the neighbor node does not find a route entry for that destination, then it forwards the RREQ message to its own detected neighbor nodes. When the destination node receives the RREQ, it returns the RREP message to the source node.

In the process of forwarding the RREQ packet, each intermediate node records the IP address of the neighbor node from which the first copy of the broadcast RREQ is received, by which a reverse route is established. The copies of the same RREQ messages received later are all discarded. The intermediate nodes add an entry to their routing table for the destination, where the neighbor node from which the RREP was received is recorded as the next hop node for that destination. The destination sequence number and lifetime of the route are copied from the RREP and recorded in the entry. When the RREP message is returned to the source node finally, a forward route from the source to destination is formed.

When a node detects that a route becomes unavailable by failure of the incident link on the route, it sends a route error (RERR) message to all the neighbor nodes, which use the route. The RERR message is sent on to their neighbor nodes and so on until it reaches the source node. The source node can then decide to either stop sending data packets or initiate a new route discovery.

DSR (Dynamic Source Routing) protocol uses a source routing mechanism in which the source node determines the complete sequence of nodes along the route on an on-demand basis and sets the list of the intermediate nodes in the packet header to indicate the sequence of nodes for the route. In this way, each packet has to carry the overhead for packet routing. However, the intermediate nodes do not need to maintain any information about the route and they can learn routes when delivering data packets.

In DSR, each node stores (caches) the routes it has learned. When a source node wants to send data packets to a destination node and has no entry in the cache for that destination, then it initiates a route discovery mechanism by broadcasting a RREQ message on its link-layer. Each node receiving the RREQ message appends their IP addresses to the RREQ message and then forwards it further. This process is done until the route to the destination is found or another node can provide a route to the destination node. Then a route reply (RREP) message containing the sequence of network hops to the destination node is returned to the source node.

In DSR, when a link failure is detected at a node (i.e. when the package has been retransmitted a maximum number of times), that node removes the link from its routes cache and sends a route error (RERR) message to each of the nodes that have used that link since an acknowledgement was last received. Those nodes have to remove the routes including that link. The retransmission of the data packet from the source node is then handled by upper layers such as the Transmission Control Protocol (TCP).

In ad hoc routing protocols that use link expiration time and traffic load of nodes, the link expiration time is defined as the time interval during which the distance of two specific nodes is kept shorter than or equal to the radio effective distance. In this routing protocol, the metric is used as a cost of each link, and the node tries to find a minimum cost route, expecting that the lifetime of such a route is longer and thus it would reduce the route update frequency and overhead due to control traffic and increase overall throughput of data packet transfer.

In this protocol, traffic load of a node is represented by a busy rate of the node during a given time period. A route that has the least traffic load of the nodes is chosen in a route selection algorithm. It is expected that the algorithm would lead to a better load balancing in the network, that is, it would avoid concentrating traffic to particular nodes in the network.

When conventional ad hoc network routing methods are used in mobile radio communication networks, some problems may arise. One problem is that since the users are mobile they will move around and the system will experience changes in the radio quality due to e.g. fading, propagation-loss, and shadowing. This is true also if the infrastructure system consists of mobile elements, e.g. if the client equipment is part of the infrastructure. Even in a system with fixed wireless infrastructure components such problems may occur, for instance due to vehicles or other objects temporarily blocking the signal path between two infrastructure components, which leads to changes of the radio link quality. The main concerns for these types of problems arise when they change faster than the update frequency of the routing table or routing path changes.

If one tries to solve the above mentioned problems by increasing the update frequency of routing information it will at some point start to degrade the transmission efficiency, due to that the updating of routing information will take up a substantial part of the possible data transmission volume in the medium.

In US patent application 2003/0120809 a system is described that detects interference sources in a network by listening for unauthorized signals in the frequency band of usage, in this case the 2.4 GHz ISM band. In this document there is a main focus on problems arising on the network layer and less on the radio layer. The document only discloses an adaptation to the current status and no relevance is taken on the possibly coming nature of link status. The system tries to adapt the packet route accordingly to reduce the effects of the interference. The solution is focusing on detecting only interference and the problem is solved by adjusting the antenna position and direction of nodes close to the interferer so as to reduce the radio coverage towards the interference source.

In U.S. Pat. No. 5,537,394 a status prediction function is introduced for a fixed network solution. The solution involves large statistical calculations of information from a status monitoring function. The statistical calculations are done for the interpretation of the implications of the entire network system and cannot readily be adjusted for an ad hoc network, and in particular not for a wireless ad hoc network.

SUMMARY

It is an object to provide an ad hoc routing method that reduces some of the above mentioned problems, by introducing a predictive routing control using link status information between infrastructure nodes.

By periodically taking measurements of the radio channel property, link quality, or other link important parameters it is possible to analyze the network/link status. This information is passed on to a routing processing element that uses this information to decide on the type of signal quality and monitors in time the changes of the link status. The processing element may extrapolate the measured trends and predict the changes of signal quality, and thus respond in an appropriate manner accordingly to efficiently use the available network resources.

Channel property information obtained from layer 1 as of the OSI network reference model is transported, together with link quality information obtained from layer 2, to layer 3 wherein routing control and traffic scheduling is located. The measured and obtained information is stored and analyzed for trends in the link quality/status between available neighboring nodes and nodes within the network area that are part of the current node's routing scheme. From this the ad-hoc routing protocol decides on appropriate paths for data packets to be sent.

Information about the channel properties and link quality can be obtained through measurement of several different parameters. Examples of these kinds of parameters may be Doppler spread of the radio signal due to radio signal fading, a different approach for this is to deduce the coherence time of the radio signal, variation speed of received signal, or signal to interference noise ratio.

The usage of this kind of predictive behavior is independent of the type of ad hoc routing protocol used.

In one embodiment, a system for efficient routing in a multiple hop wireless communication network comprising a plurality of network nodes, characterized in that the system comprises means for acquiring quality information indicating link status between the infrastructure nodes, means for using the link quality information in a route determination process in the infrastructure nodes using a predictive procedure; the link quality information containing information about a time varying information of the link status, and the predictive model uses the time varying information of link status in the predictive procedure; and routing means for routing data packets according to a determined route.

The wireless link may be a transmission system based on electromagnetic radiation with a frequency in the range of 100 kHz to 100 PHz. The system even further characterized in that the transmission system is one or several of IEEE 802.11, IEEE 802.15, IEEE 802.16, HiperLAN, HomeRF, Bluetooth, IR, UWB, JTRS, 3G, GPRS, or EDGE.

In another aspect, the system comprises a reactive ad hoc routing protocol, a proactive ad hoc routing protocol, or a combination of reactive and proactive ad hoc routing protocols.

According to another aspect of the invention, the system characterized in that the link status information is radio channel status information given by measurement of at least one of Doppler spread, coherence time, average fading duration, signal strength, or signal to interference noise ratio.

The predictive procedure for an ad hoc routing protocol may use obtained link status information and radio channel information in a comparison with determined routing anticipation criteria.

The predictive model for the reactive ad hoc routing protocol may obtain information about link status and a radio channel status from modified RREP, Hello messages, Acknowledgements, or RERR messages.

The predictive model for the proactive ad hoc routing protocol may comprise a modified routing table containing a route status field with information about a link status.

The link status information may comprise energy status of nodes in the network.

The link status information may comprise number of NACK or ACK signals between nodes in the network.

The system according another aspect, characterized in that the link status information comprises the number of bit errors in a communication between nodes in the network.

The link status information may comprise information about ownership of nodes in the network.

In another embodiment, a routing protocol is used in a system according to above description.

The routing protocol further being one of a proactive ad hoc routing protocol, reactive ad hoc routing protocol, or a combination of a proactive and reactive ad hoc routing protocol.

In another embodiment, a method for efficient routing in a wireless communication network comprising a plurality of nodes, the method comprising the steps of: acquiring link status between nodes, updating a routing element with link status information, determining an efficient route according to a predictive model using the link status information, and routing traffic according to the determined route.

The route determination step comprise the step of using a reactive ad hoc routing protocol, a proactive ad hoc routing protocol, or a combination of reactive and proactive ad hoc routing protocols.

In another aspect, the method acquires wireless link status information from measurements of at least one of Doppler spread, coherence time, average fading duration, signal strength or signal to interference noise ratio.

The predictive procedure for an ad hoc routing protocol comprises the step of using obtained link status information in a comparison with determined routing anticipation criteria.

The predictive procedure for the reactive ad hoc routing protocol comprise the step of obtaining information about link status from modified RREP, Hello messages Acknowledgements or RERR messages.

The predictive procedure for the proactive ad hoc routing protocol comprises the step of modifying a routing table with a route status field with information about link status.

The link status information may be energy status of nodes in the network, ACK signals between nodes in the network, the number of bit errors in a communication between nodes in the network, or information about ownership of nodes in the network.

The method is further characterized in that the wireless communication is a transmission system based on electromagnetic radiation with a frequency in the range of 100 kHz to 100 PHz. The node even further characterized in that the transmission system is one or several of IEEE 802.11, IEEE 802.15, IEEE 802.16, HiperLAN, HomeRF, Bluetooth, IR, UWB, JTRS, 3G, GPRS, and EDGE.

In another embodiment, a node for efficient routing in a multiple hop wireless communication network characterized in that the apparatus comprises: link quality acquiring means, link status monitoring means feeding link status information to routing means, determining an appropriate route according to the link quality information using a predictive procedure.

The wireless link may be a transmission system based on electromagnetic radiation with a frequency in the range of 100 kHz to 100 PHz. The node even further characterized in that the transmission system is one or several of IEEE 802.11, IEEE 802.15, IEEE 802.16, HiperLAN, HomeRF, Bluetooth, IR, UWB, JTRS, 3G, GPRS, and EDGE.

The node comprises a reactive ad hoc routing protocol, a proactive ad hoc routing protocol, or a combination of reactive and proactive ad hoc routing protocols.

In another aspect, the node is characterized in that the link status information is radio channel status information given by measurement of at least one of Doppler spread, coherence time, average fading duration, signal strength, or signal to interference noise ratio.

The node may be further characterized in that the predictive model for an ad hoc routing protocol uses obtained link status information and radio channel information in a comparison with determined routing anticipation criteria.

The node may be further characterized in that the predictive model for the reactive ad hoc routing protocol obtains information about link status and radio channel status from modified RREP, Hello messages, Acknowledgements, or RERR messages.

The node is further characterized in that the predictive model for the proactive ad hoc routing protocol has a modified routing table containing a route status field with information about radio link status.

The node is further characterized in that the link status information comprises energy status of nodes in the network, number of NACK or ACK signals between nodes in the network, the number of bit errors between nodes in the network, or information about ownership of nodes in the network.

In another embodiment, an interlayer coordination for use in a wireless communication network comprising: a first layer comprising radio channel information acquiring means, a second layer comprising link status information acquiring means, and a third layer comprising link status monitoring means obtaining radio channel and link status information from the first and second layers, route determining means using the link status information, and routing means for routing data via determined route.

In another embodiment, a computer program for controlling routing in a multiple hop wireless communication network comprising: a first instructions set for acquiring link status information between infrastructure nodes; a second instruction set for determining an efficient route using the acquired link status information in a predictive procedure; and a third instruction set routing traffic according to the determined route.

In another embodiment, an article of manufacture comprising a computer program for controlling routing in a multiple hop wireless communication network comprising: a first instructions set for acquiring link status information between infrastructure nodes; a second instruction set for determining an efficient route using the acquired link status information in a predictive procedure; and a third instruction set routing traffic according to the determined route.

A method for efficient routing in a wireless network characterized in that data packets are routed using the following steps: providing a link status information by measuring link status quality between infrastructure nodes in the network; updating a routing element with the link status information; determining a route using the link status information; routing the data packet via the determined route; and upon detection of a routing failure of a data packet, retransmitting the data packet via a different route determined using a predictive procedure using link status information of infrastructure nodes in the wireless network.

This and other objects, features, functions, and benefits will become apparent with reference to the detailed description, which follows.

DETAILED DESCRIPTION

Figure 6:
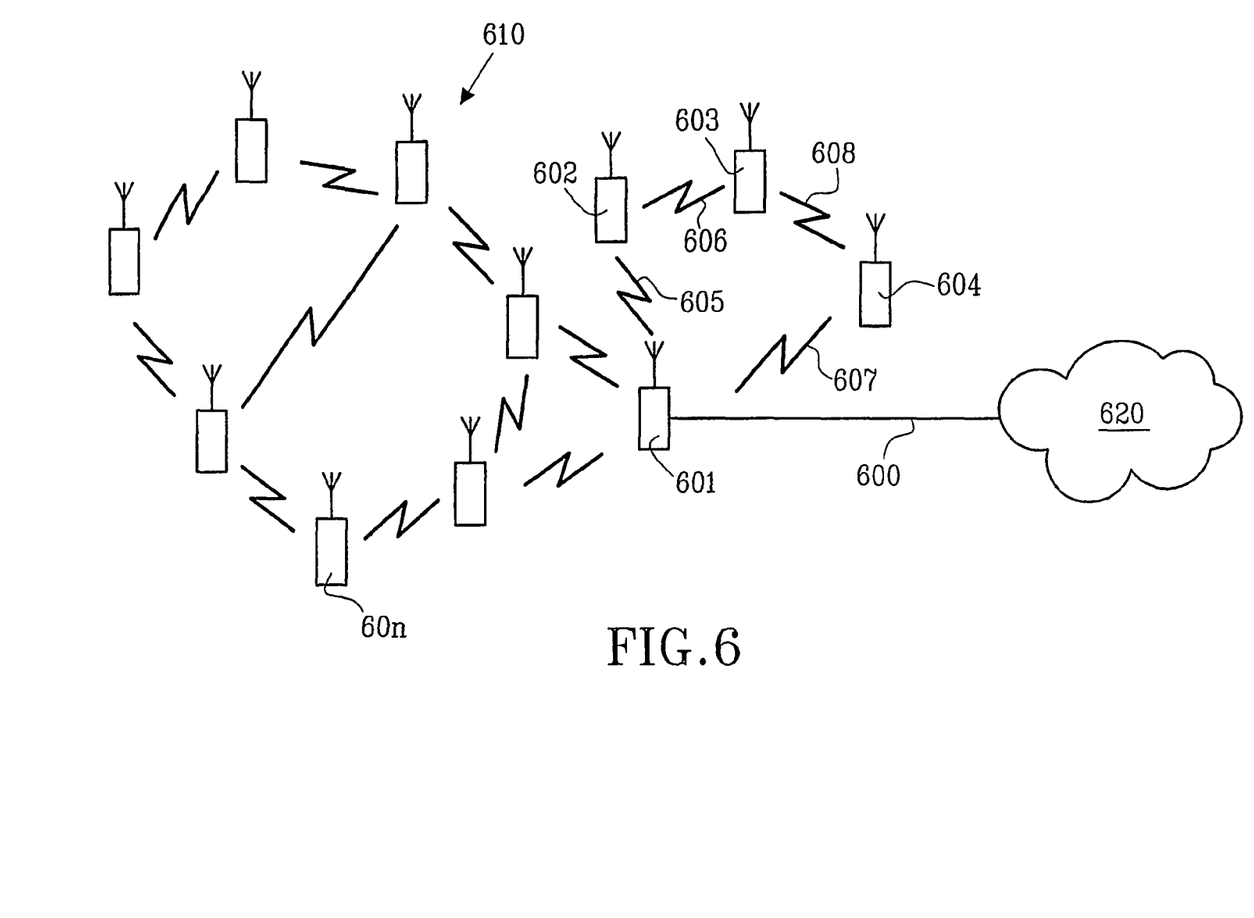
FIG. 6 is a schematic illustration of a wireless ad hoc network topology.

In FIG. 6, a mobile multihop wireless ad hoc network is shown. A plurality of nodes or infrastructure elements 601, 602, 603, 604 . . . 60n builds up an ad hoc network 610 together by communicating with each other and forwarding data traffic and control traffic for each other, in order to maintain the network traffic between the communicating end nodes and intermediate nodes. Sometimes one or several gateways 601 are present in an ad hoc network 610. This gateway 601 acts as a link between for example a wireless ad hoc network 610 and a standard fixed IP network 620 (e.g. Internet). The connection 600 to the standard IP network may be either a fixed line, using for example an Ethernet network, or a fixed wireless connection using for example LMDS or "Mini-link" systems or similar technology.

Not shown explicitly in FIG. 6 are client/end user terminals that may communicate via these infrastructure nodes 601, 602, 603, 604 . . . 60n; however, the infrastructure may actually be built up by using client/end user terminals themselves. It may also be built by dedicated routers or a network may be built on a combination of these two elements. Today client/end user terminals have the computing power to handle networking applications, even in an ad hoc environment. Client terminals may include equipment such as desktop computers, workstations, laptops, PDA's (Personal Digital Assistant), mobile phones, or other data processing equipment with communication or networking means.

Figure 8:
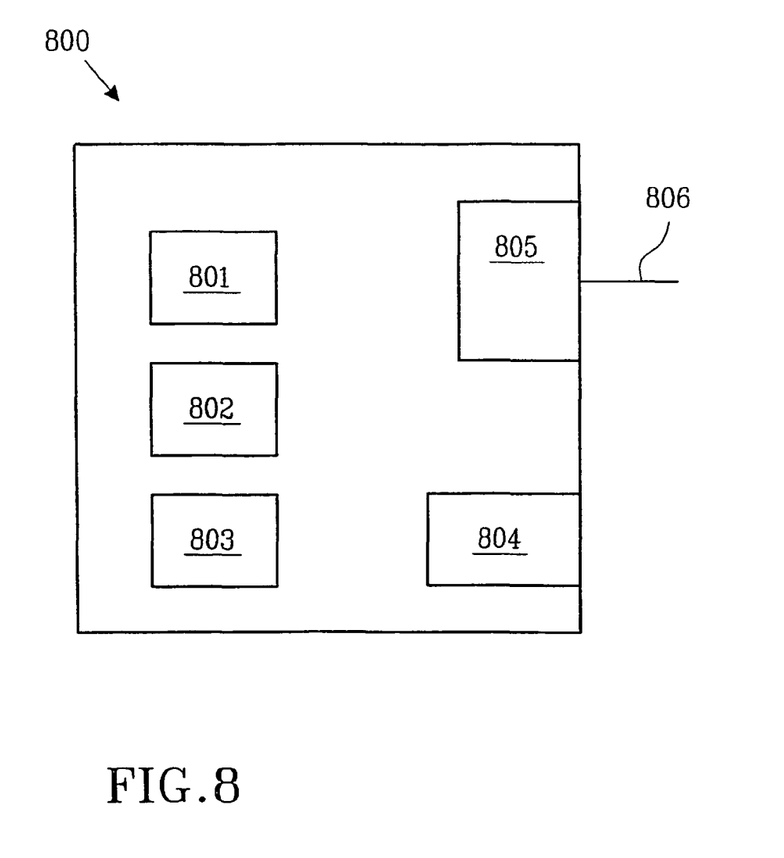
FIG. 8 is a schematic block diagram illustrating a node in the network.

An infrastructure element or node 601, 602, 603, 604 . . . 60n, 800 comprise of at least processing means (801), storing means (802), communication means 805 and routing means 101, 803. The communication means 805 may be wireless 806 or using a wired connection 806, however in a preferred embodiment the communication means 805 is wireless. The routing means 101, 803 is implemented in a routing algorithm, often using a software program, and normally both the routing means 101, 803 and/or communication means 805 are often embedded in the infrastructure element 800, but they may also be located in an external device connected to an infrastructure element 601, 602, 603, 604 . . . 60n, 800 through a connector 804. An example of this arrangement may be a PDA that has an external device connected to the PDA; this external device handles the routing and/or communication means for enabling the PDA to be part of an ad hoc network 610 or a wireless network in general.

Figure 1:
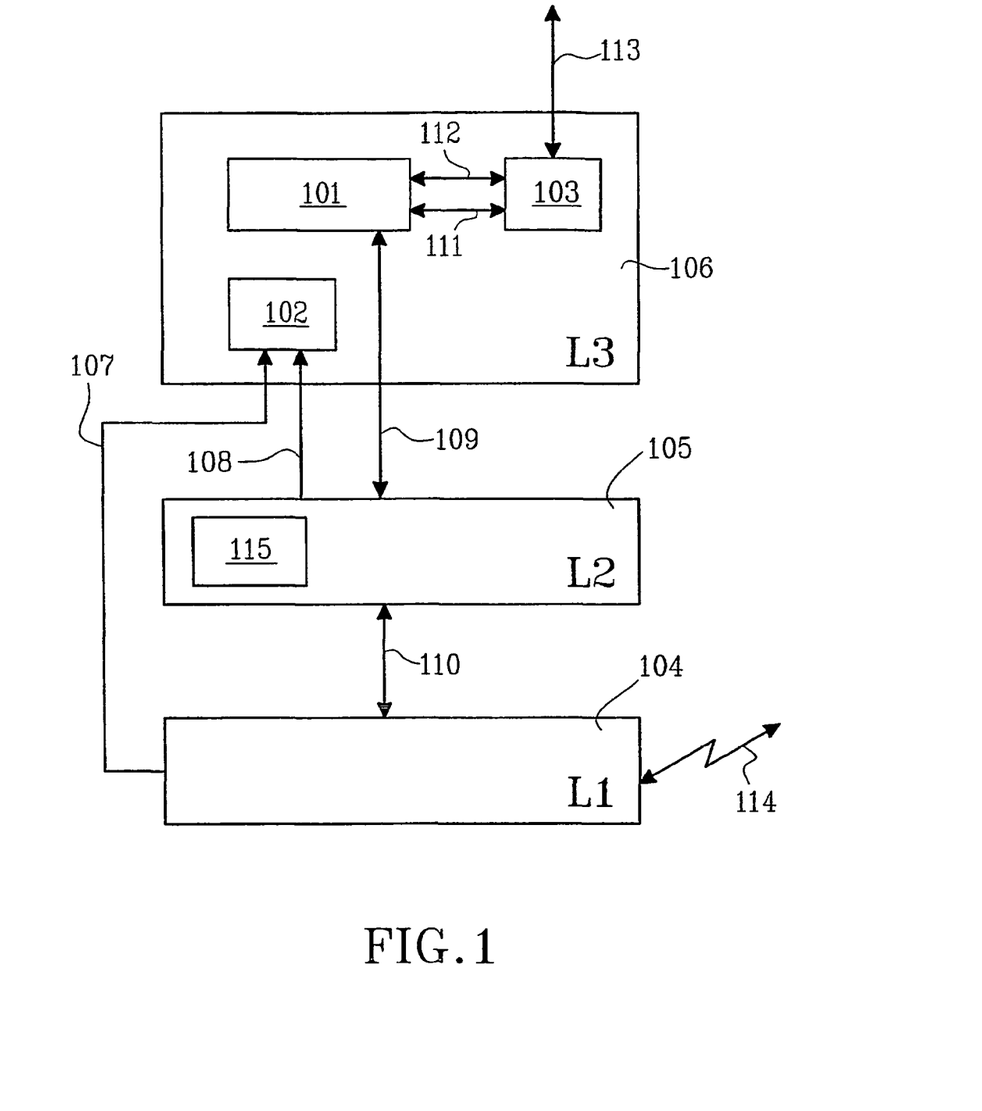
FIG. 1 is a schematic block diagram of some of the components and their respective role in an inter-layered concept of an example embodiment.

In FIG. 1 the key components in the routing element 800 and their respective roles are shown together with the data and control traffic flow patterns within a layered network reference model, e.g. the OSI model. The first layer 104 (L1) is responsible for the physical transmission of data bits and in this layer there may be functionality to measure and obtain the status and quality of the properties of the physical medium, for example the wireless radio channel status. This information is passed on to the third layer 106 (L3) to a link status monitor 102.

There are several different parameters that may be measured in order to obtain the status of radio links between the infrastructure nodes. One such parameter is the Doppler spread. The Doppler spread, average fading duration, and coherence time (proportional to average fading duration) are both parameters that describe the time varying nature of the radio channel. If there is a relative movement between a mobile station and infrastructure node then there will be fading problems associated thereof. The same applies if there is an object moving in the radio path between two infrastructure nodes or an infrastructure node and a mobile station. When each node periodically sends and receives beacon signals, for example, "hello messages", or in any other way monitors the radio signals from neighboring nodes, it is possible to measure the so called Doppler shift $f_D$ which may give an indication of the radio channel quality, Doppler shift is a measure on the Doppler spread width. This measurement is compared to an upper limit for the Doppler shift $f_{DUL}$ which sets the limit to where the ad hoc routing algorithm still will be able to adapt without degrading the transmission efficiency. If the signal bandwidth is much greater than the determined threshold limit of the Doppler spread the effects are negligible and this situation is defined as slow fading and thus not a problem for the ad hoc routing algorithm to adapt to by increasing the update frequency. However if the Doppler spread is higher than the determined threshold level, the fading is in a so called fast region, then in the case that the routing algorithm increases the frequency of route updating, this will at some point start to degrade traffic flow efficiency since the control traffic will have an increasingly larger portion of the available transmission capabilities. It should be noted that as the Doppler spread increases further, the effect of FEC (Forward Error Correction) increases as well, thus providing a steady improved L2 link quality.

Average fading duration $<\tau_D>$ is calculated from the Rayleigh model of fading. From these calculations it is possible to deduce the average fading duration and compare this to a threshold limit $<\tau_{DUL}>$, which may be compared to its counterpart $f_{DUL}$. $<\tau_D>$ may be calculated from the following equation:

$$<\tau_D> = \frac{\sum_{m=1}^{M} \tau_m}{N(R_S)T}$$

where M is the number of monitored fade durations $\tau_m$ is the m-th fade duration, $N(R_S)$ is the number of faded level crossings at the level $R_S$ per second and T is the measurement time.

Figure 2:
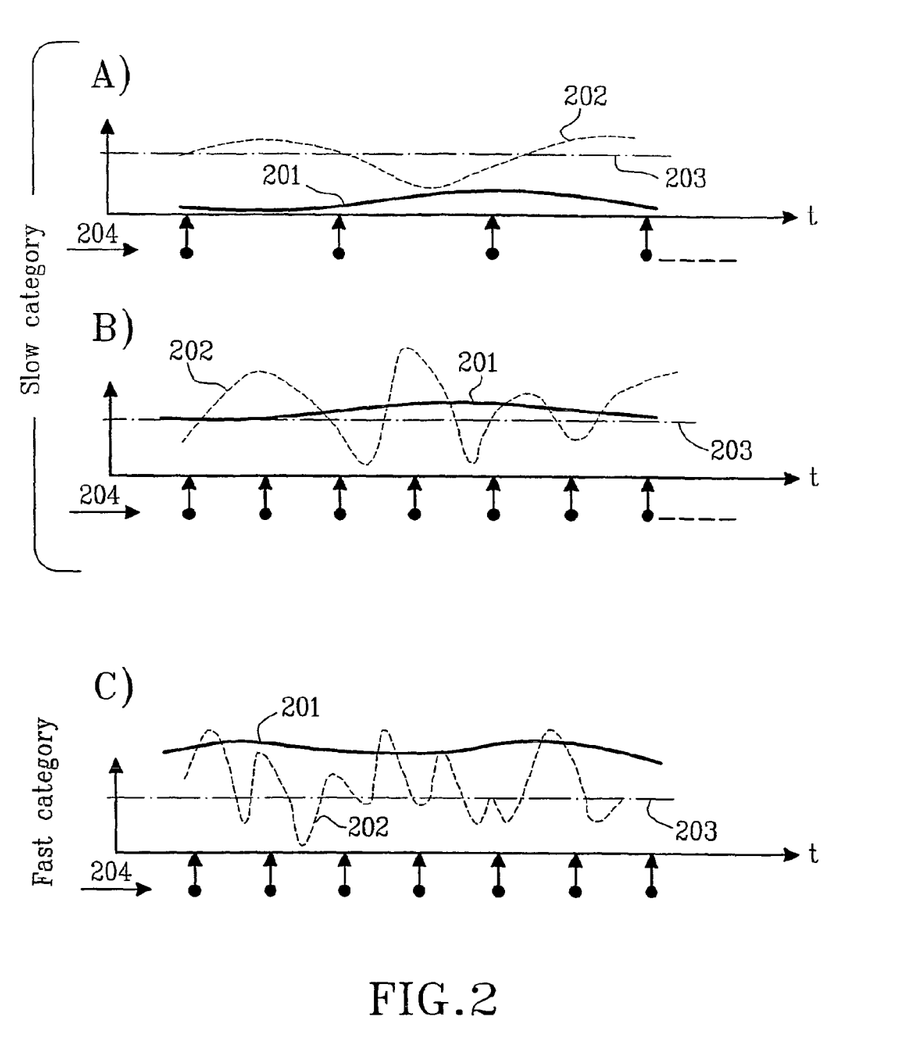
FIG. 2 is a diagram of signal strength and a variation speed parameter versus time with a threshold level governing the slow or fast category determination.

Another parameter describing the quality of the radio link is the so called variation speed VS 201, as illustrated in FIG. 2, which is a measure on how fast the received signal strength 202 or signal to interference-noise ratio 202 is changing. VS 201 may be calculated by differentiating the instantaneous channel strength 202. When VS 201 is lower than a threshold level $V_{SUL}$ 203, the ad hoc routing algorithm is still able to adapt without degrading the network efficiency. However when VS 201 is higher than $V_{SUL}$ 203 the same problem will arise as for the above mentioned Doppler spread, where the update frequency 204 of the routing table will lead to a degradation of the transmission efficiency due to that the control traffic takes up a larger portion of the available transmission capabilities.

Figure 4:
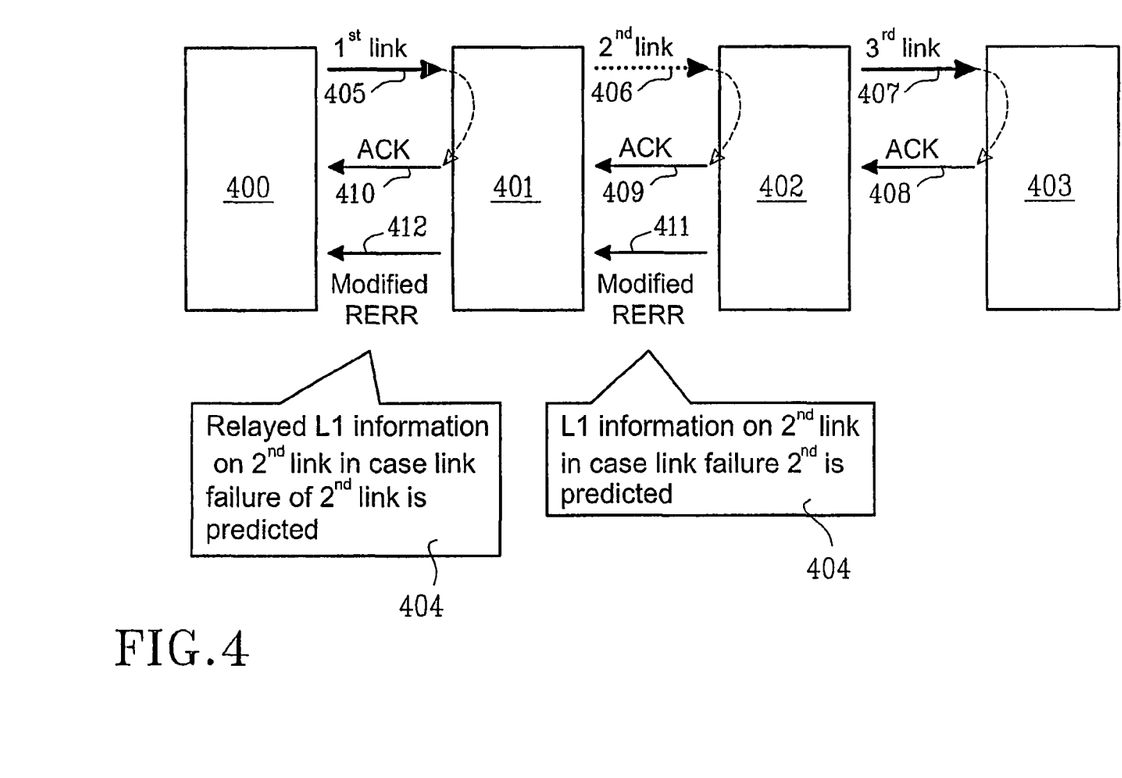
FIG. 4 is a schematic illustration on how channel status predictions are passed back in the system for a reactive protocol.

The second layer 105 (L2) handles the transmission control of larger pieces of information and takes care of error handling; detection and appropriate responses to errors. It may also provide the third layer 106 with information about link quality since it handles the error detection. For example, information about the number of NACK or ACK 408, 409, and 410 signals may be passed on to the link status monitor 102. An interpretation of these parameters may be that an increase in the number of NACK signals would indicate that the link is reducing in quality, while an increase of ACK signals would indicate that the radio channel is improving in quality.

Also the number of bit errors that are detected and corrected by a Forward Error Correction element (FEC) located in L2 105 may be reported to the link status monitor 102. This parameter may reflect link quality that does not appear explicitly from the above mentioned ACK/NACK signaling.

The link status monitor 102 monitors the channel property and link quality information obtained from the first network layer 104 L1 and second network layer 105 L2. The link status monitor 102 determines the quality, with respect to pre-determined criteria, of the radio channel and sorts it into one of two different types of fading categories; slow or fast fading if Doppler spread is measured or into either slow or fast VS categories if VS is measured.

The link status monitor 102 may also receive information from an application layer or the hardware of the node that is relevant in a route determination process. Such information may be, for example, battery level or energy status of nodes in the network in order to exclude such nodes in the routing path or at least reduce the amount of usage of such nodes. This exclusion is done in order to preserve the battery level of these nodes, since they may be client terminals and the clients/end users do not want their equipment to run out of battery power of several reasons. There is also an increased risk that nodes with low battery levels may stop working in the near future time. Another such relevant routing parameter may be ownership information of infrastructure nodes, in order to be able to implement a least economical cost routing method in a multi owner network. In such a method packets may be routed via infrastructure elements owned by the client's operator or routed via infrastructure elements where the client's operator has an agreement with the owner. This approach is useful if there are monetary routing costs implemented at each infrastructure node and it is of interest to keep the monetary costs as low as possible. This approach is not limited to wireless ad hoc networks but may be implemented in any communication network where IP packets are routed.

The link status monitor 102 transmits the obtained and analyzed status information to a routing element 101. This element 101 performs routing calculations to determine a route for the present data packet to be sent, it also determines when and how it should update the routing table. The routing element 101 handles sending and receiving both data traffic and control traffic. It handles processing routing updates and initiates routing updates according to pre-determined schedules or from status information obtained from the link status monitor 102.

The route determination method or procedure using a predictive model or procedure that consists of taking the obtained link status information from measurements of radio and/or link quality, monitor the variations of links, and anticipate or extrapolate the near-future status of each link stored in the routing table, thus the routing element 101 may update the routing configuration before links fail. This has the benefit of reducing unnecessary traffic flow due to lost packages.

The route determination method or procedure may be solved in a software program residing in the infrastructure nodes.

In L3 106 information about previous measurements are stored for a certain amount of time in order to understand the trends and changes of link quality. This is stored with standard techniques depending on hardware used in infrastructure nodes.

Table 1 shows some scenarios and their interpretation considering signal strength together with a fading parameter or variation speed VS parameter.

TABLE 1

Characteristics of link-status

| Average signal strength or L2 quality | High $f_D$ or high VS | Low $f_D$ or Low VS |
|---|---|---|
| Low | Steady and random errors | Bursty errors for some duration of time |
| High | Steady and good condition | Bursty and good condition for some duration of time |

From table 1 it is possible to obtain the following examples of anticipation criteria together with below listed assumptions on signal strength trends:

1. In case of low $f_D$ or low VS:
   If the signal strength goes from low to high, a new route is going to arise.
   If the signal strength goes from high to low, the current route will fade out.
2. In case of high $f_D$ or high VS:
   If the signal strength goes from low to high, a new steady route is going to grow slowly.
   If the signal strength goes from high to low, the current steady route is going to disappear slowly.

Signal strength or L2 quality in Table 1 refer to average levels, which means that they represent channel quality during a relatively long time range, while $f_D$ or VS are defined in the short time range. The definition of long and short in this respect depends on the system where this invention is implemented. Long time range may be defined as covering the range of several traffic frames, while a short time range may be defined as covering the range of several transmitted symbols or bits. Therefore fast channel variations in short time may cause random bit errors that may be recovered by FEC techniques (forward Error Correction). Since FEC carries an information part (sometimes called systematic bits) and its parity part using different time instants. If the time instants are separated enough, so there is no time channel correlation between the two instants, the FEC may provide a time-diversity effect; in which either the information part, or the parity part may survive fading. The FEC function may then recover the correct information.

From these cases it is apparent how it is possible to modify the ad hoc routing protocol in a predictive manner, in particular concerning route updates.

Some examples of using this method will now be given for both reactive and proactive ad hoc routing protocols.

If the routing is based on a proactive protocol the routing table is updated periodically through normal procedures depending on protocol used. One such protocol may be DSDV, which maintains a routing table of nodes in the network. This routing protocol is modified in accordance with the status measurement and an extra listing in the routing table is added accordingly, indicating the link status. The link status information is ditributed using normal techniques depending on routing protocol chosen, for instance using "hello messages" and/or topology messages.

Figure 5:
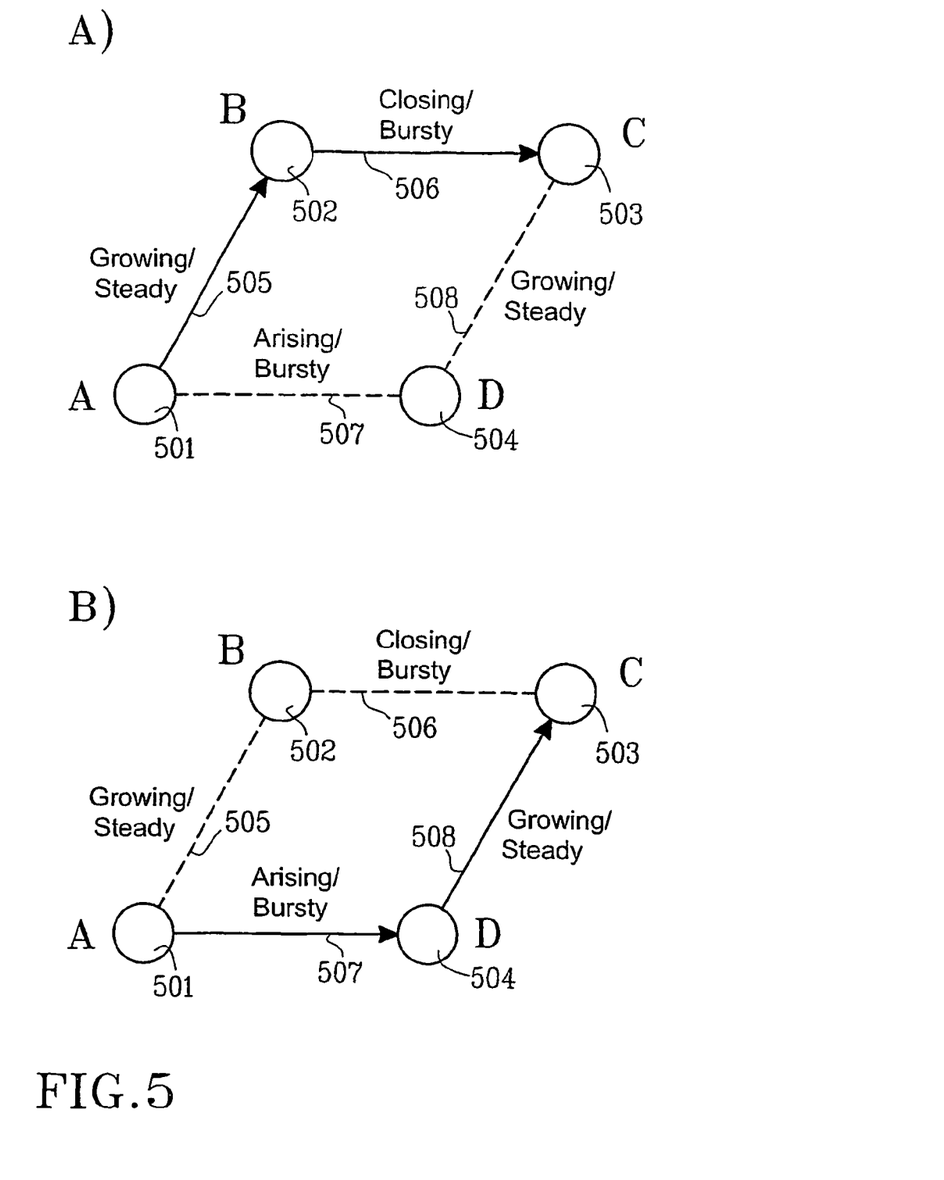
FIG. 5 is a schematic depiction of a small ad hoc network and the possible routes between two nodes in this network.

If, for example, a data packet is to be sent to node C 503 from node A 501 as indicated in FIG. 5A, the data packet is transmitted through node B 502. However since the current link status between node B 502 and node C 503 in this example is known to be closing (i.e. the signal strength is reducing in time) and the behavior is bursty (i.e. the fading or VS parameter has been measured as lower than the threshold value), and the system also knows from measurements that a route passing through node D 504 has a better quality, the routing element 101 then decide that the next packet shall be sent via node D 504 instead of using the old route 505 and 506 via node B 502, this change of route is indicated in FIG. 5B.

Figure 7:
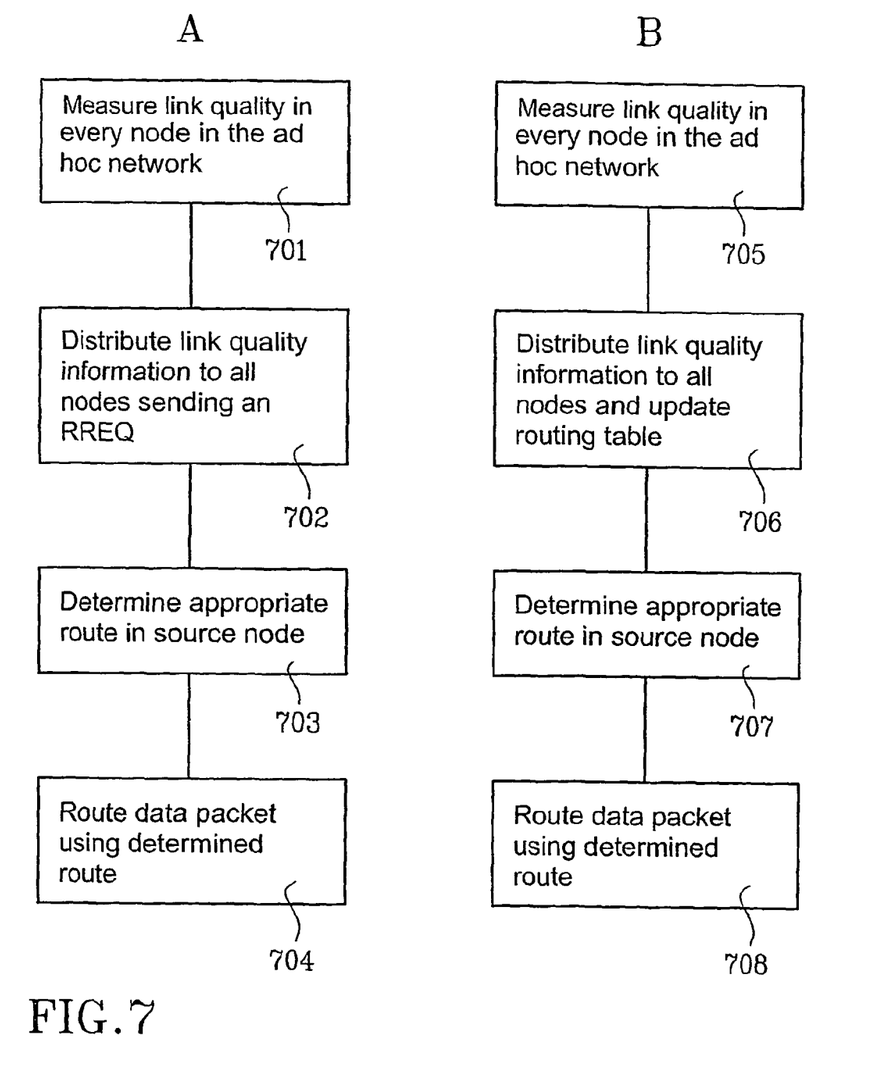
FIG. 7 is a schematic block diagram illustrating part of the routing and route determination process for a reactive routing ad hoc protocol (FIG. 7A) and a proactive ad hoc routing protocol (FIG. 7B).

A routing method in accordance with a proactive routing protocol may be illustrated in below described algorithm (see also FIG. 7B):

1. All nodes in the wireless ad hoc network measure their respective link quality towards the neighbors on a regular basis.
2. All link quality information is distributed to all nodes in the wireless ad hoc network and updated and stored in their respective routing tables in accordance with determined routing update frequencies.
3. A source node from where data packets originate determines an appropriate route using the link quality information and the predictive model.
4. The data packet under consideration is routed to a destination node according to the determined route.

If the routing is based on a reactive routing protocol a slightly different method is used. Route determination is not updated in the same periodic manner as for the proactive protocol, but instead updated on demand; the routing protocol reacts on the demand of sending a packet and thus a need to know at least part of the route to send the packet.

Figure 3:
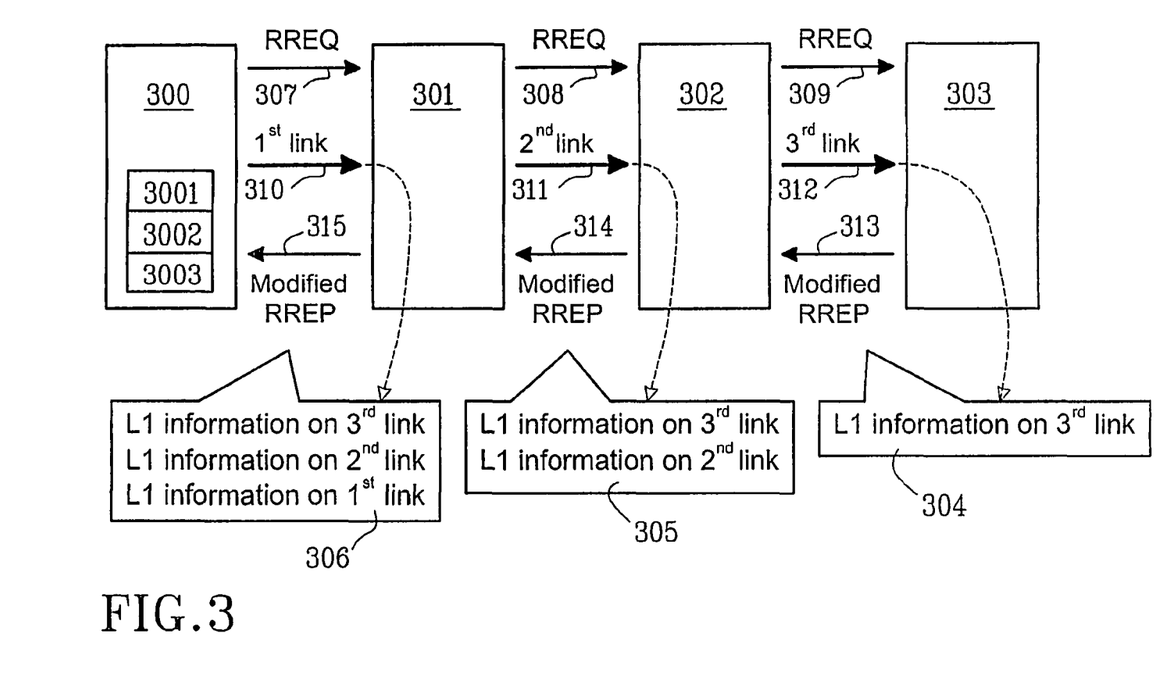
FIG. 3 is a schematic illustration on how channel status information and link quality information are passed back in the system for a reactive routing protocol.

As is seen in FIG. 3, which illustrates an example of modified route discovery in a reactive routing protocol, link status information 304, 305, and 306 is included in the normal route reply (RREP) message defining the route discovery information sent back to the source node 300. With this information the routing element 101 may change the route of the data packet depending on the obtained information about the current active route. The included status information gives a modified RREP message 313, 314, and 315 which provides the routing element 101 with information to obtain the current link status and predict the near future link status of all links in the chain between the source 300 and destination node 303. The link status information about each node in the routing chain is added to the modified route reply (RREP) message. In FIG. 3 exemplary four nodes are involved in a packet transaction. A packet is transferred from a source node 300 to a destination node 303 via two intermediate nodes 301 and 302. When the packet is transferred to the destination node 303 the last intermediate node 302 sends back a modified RREP message 313. This modified RREP message 313 contains information about the link information 304 between the last intermediate node 302 and the destination node 303. The RREP message is transferred back in the chain to the previous intermediate node 301 (in the example of FIG. 3, this is intermediate node 1 301) and this node 301 adds information about the link status between the link between itself and the next node 302 up the chain (Intermediate node 2 302). When the RREP message 315 finally returns to the source node 300 it will contain information about all the links in the network routing chain between the source node 300 and destination node 303. This kind of scheme may be used independently on the number of nodes in the network, however in FIG. 3 only four nodes are depicted but it should be understood that this is not a limiting number. The number of nodes may be fewer or more. Only L1 information in the RREP has been illustrated in FIG. 3, however also L2 information from each node involved may be included and/or other information, from other parts of the infrastructure nodes, relevant to routing may also be included. This method may be used by an ad hoc based reactive routing protocol like, for example, AODV or DSR.

A routing method in accordance with a reactive routing protocol may be illustrated in below described algorithm (see also FIG. 7A):

1. All nodes in the wireless ad hoc network measure their respective link quality towards the neighbors on a regular basis.
2. All link quality information is distributed to all route participating nodes in the wireless ad hoc network and updated and sorted in their respective routing tables when a route request has been issued.
3. The source node determines an appropriate route using the link quality information and the predictive model.
4. The data packet under consideration is routed according to the determined route.

It is also possible to modify the standard RERR signal sent in ad hoc based reactive routing protocols and this is illustrated in FIG. 4. This modification is done by sending a modified RERR message from a node 402 that has detected a possibly coming failure towards the next hop 406. This modified RERR contains information about the link status 404 of this link 406 of interest and it is sent back to the source node 400. The intermediate nodes earlier in the network chain 401 relay this information 404 to the source node 400. The routing element 101 in the source node 400 uses this information 404 and may change the route accordingly.

Using this modified RERR 404 approach it is possible to drastically reduce packet retransmissions due to link failures later in the network chain. Normally it takes quite some time before the routing protocol detects a link failure and the routing element 101 will try to resend data packet several times before deciding that a link failure has occurred and change the routing configuration. With the present method it is possible to change the route path before a link fails and therefore the number of retransmissions due to link failures may be reduced or even eliminated.

With information about the link status between nodes the predictive model may be used to change route upon the detection of a link failure before retransmission of data via the same route are done, as is the normal procedure for standard routing protocols. The sent packet that failed is retransmitted using a new route since the routing element 101 is aware of the link failure through the link status acquiring method, specifically through the modified RERR messages. FIGS. 5A and 5B are used to illustrate this routing diversity example, wherein a packet is sent from node A 501 to node C 503 first via node B 502 and upon link failure the retransmission of the same packet goes via node D 504 instead.

The intelligent routing model using the predictive method may be used in many different application areas such as, for example, by the police in general or during special events, rescue forces during a disaster or an accident, military forces on the battlefield or in training, or for building wireless access areas for communication purposes both for residential and commercial network access. For example it is possible to use these ad hoc networks to build up broadband access using short range, low cost, wireless equipment in residential areas where other broadband access technology is scarce or too expensive to connect to. It may also be used in commercial districts for either providing broadband access to enterprises or small companies, or for wireless connections at so called hotspots. Hotspots are characterized in that they provide communication access within a certain area, for example at an airport lounge or in hotels, for paying customers or for free depending on business model.

It should be noted that even though in a preferred embodiment a link status monitor 102 is used, this function might also be incorporated into the routing element 101.

The routing protocol is independent on the radio-coding scheme used and any radio type may be used. For example, one may mention radio standards as of in the IEEEE802.11 series (e.g. IEEEE 802.11a, IEEEE 802.11b, IEEEE 802.11g and so on), IEEE 802.15, IEEE 802.16, HiperLAN, HomeRF, Bluetooth, IR (Infrared), UWB (Ultra WideBand), JTRS (Joint Tactical Radio System), 3G (Third Generation mobile communication), GPRS (General Packet Radio Service), or EDGE (Enhanced Data rate for Global Evolution). However the possible radio standards are not limited to the above mentioned. It may be any suitable electromagnetic radiation based transmission scheme operating within the frequency band of 100 kHz to 100 PHz; this includes radio frequencies, microwave frequencies, and frequencies in the infrared, visible, and ultraviolet regimes.

Parallel applications for solving traffic scheduling and ad hoc route diversity:

1. "Ad hoc route diversity"
2. "Ad hoc traffic scheduling"

by the same inventors has been filed simultaneously and incorporated herein through reference.

It should also be noted that even though a wireless ad hoc network has been illustrated in the example embodiment the same concepts may be applicable to a wired network or fixed wireless network.

Although the technology has been described in detail for the purpose of illustration, it is to be understood that such detail is solely for that purpose and that variations can be made therein by those skilled in the art without departing from the spirit and scope of the claims.

The invention claimed is:

1. A system for efficient routing in a multiple hop wireless communication network comprising a plurality of infrastructure nodes, the system comprising:
   link monitoring circuitry for acquiring link quality information indicating link status between said infrastructure nodes;
   electronic processing circuitry for using said link quality information to determine a route path through the infrastructure nodes using a predictive procedure;
   said link quality information containing time varying information of said link status including radio channel information given by measurement of at least one of Doppler spread, coherence time, average fading duration, signal strength, or signal to interference noise ratio; and
   said predictive procedure being configured to use said time varying information to provide multiple calculated anticipation scenarios anticipating a near-future link status based on at least a fading parameter that indicates one of a slow fading category and a fast fading category, with the predictive procedure being configured to analyze the anticipation scenarios to determine the route path including using the link quality information in a comparison with determined routing anticipation criteria; and
   a router for routing data packets according to the determined route path.

2. The system according to claim 1, wherein said wireless communication is a transmission system based on electromagnetic radiation with a frequency in the range of 100 kHz to 100 PHz.

3. The system according to claim 2, wherein said transmission system complies with one or more of IEEE 802.11, IEEE 802.15, IEEE 802.16, HiperLAN, HomeRF, Bluetooth, IR, UWB, JTRS, 3G, GPRS, or EDGE.

4. The system according to claim 1, comprising a reactive ad hoc routing protocol.

5. The system according to claim 4, wherein said predictive model for said reactive ad hoc routing protocol obtains information about link status and a radio channel status from modified RREP, Hello messages, Acknowledgements, or RERR messages.

6. The system according to claim 1, comprising a proactive ad hoc routing protocol.

7. The system according to claim 6, wherein said predictive model for said proactive ad hoc routing protocol comprises a modified routing table containing a route status field with information about a link status.

8. The system according to claim 1, comprising a combination of reactive and proactive ad hoc routing protocols.

9. The system according to claim 1, wherein said link status information comprises an energy status of nodes in the network.

10. The system according to claim 1, wherein said link status information comprises a number of NACK or ACK signals between nodes in the network.

11. The system according to claim 1, wherein said link status information comprises a number of bit errors in a communication between nodes in the network.

12. The system according to claim 1, wherein said link status information comprises information about ownership of nodes in the network.

13. A routing protocol used in a system according to claim 1.

14. The routing protocol according to claim 13 being one of a proactive ad hoc routing protocol, reactive ad hoc routing protocol, or a combination of a proactive and reactive ad hoc routing protocol.

15. A method for efficient routing in a wireless communication network comprising a plurality of nodes, the method comprising the steps of:
   acquiring link status information between nodes containing time varying information of said link status including radio channel information given by measurement of at least one of Doppler spread, coherence time, average fading duration, signal strength, or signal to interference noise ratio;
   updating a routing element with said link status information;
   determining an efficient route path according to a predictive procedure using said link status information that uses the time varying information to provide calculated anticipation scenarios anticipating a near-future link status based on at least a fading parameter that indicates one of a slow fading category and a fast fading category, the anticipation scenarios being analyzed to determine said route path including using at least some of said link status information in a comparison with determined routing anticipation criteria; and
   routing traffic according to said determined route path.

16. The method according to claim 15, wherein said route determining step comprises the step of using a reactive ad hoc routing protocol.

17. The method according to claim 16, wherein said predictive procedure for said reactive ad hoc routing protocol comprises the step of obtaining information about link status from modified RREP, Hello messages Acknowledgements, or RERR messages.

18. The method according to claim 15, wherein said route v step comprises the step of using a proactive ad hoc routing protocol.

19. The method according to claim 18, wherein said predictive procedure for said proactive ad hoc routing protocol comprises the step of modifying a routing table with a route status field with information about link status.

20. The method according to claim 15, wherein said route determining step comprises the step of using a combination of reactive and proactive ad hoc routing protocols.

21. The method according to claim 15, wherein said link status information comprises an energy status of nodes in the network.

22. The method according to claim 15, wherein said link status information comprises a number of NACK or ACK signals between nodes in the network.

23. The method according to claim 15, wherein said link status information comprises a number of bit errors in a communication between nodes in the network.

24. The method according to claim 15, wherein said link status information comprises information about ownership of nodes in the network.

25. The method according to claim 15, wherein said wireless communication is a transmission system based on electromagnetic radiation with a frequency in the range of 100 kHz to 100 PHz.

26. The node according to claim 25, wherein said transmission system complies with one or more of IEEE 802.11, IEEE 802.15, IEEE 802.16, HiperLAN, HomeRF, Bluetooth, IR, UWB, JTRS, 3G, GPRS, and EDGE.

27. A node for efficient routing in a multiple hop wireless communication network, comprising:
  link quality acquiring circuitry;
  a link status monitor, coupled to the link quality acquiring circuitry, for generating link quality status information, said link quality information including radio channel information given by measurement of at least one of Doppler spread, coherence time, average fading duration, signal strength, or signal to interference noise ratio;
  a router for determining an appropriate route according to said link quality status information and calculated anticipation scenarios using a predictive procedure anticipating a near-future link status based on at least a fading parameter that indicates one of a slow fading category and a fast fading category, wherein said predictive procedure uses at least some of said link quality information in a comparison with determined routing anticipation criteria.

28. The node according to claim 27, wherein said wireless communication is a transmission system based on electromagnetic radiation with a frequency in the range of 100 kHz to 100 PHz.

29. The node according to claim 28, wherein said transmission system complies with one or more of IEEE 802.11, IEEE 802.15, IEEE 802.16, HiperLAN, HomeRF, Bluetooth, IR, UWB, JTRS, 3G, GPRS, and EDGE.

30. The node according to claim 27, wherein the router is configured to use a reactive ad hoc routing protocol.

31. The node according to claim 30, wherein said predictive procedure for said reactive ad hoc routing protocol obtains information about link status and radio channel status from modified RREP, Hello messages, Acknowledgements, or RERR messages.

32. The node according to claim 27, wherein the router is configured to use a proactive ad hoc routing protocol.

33. The node according to claim 32 wherein said predictive procedure for said proactive ad hoc routing protocol has a modified routing table containing a route status field with information about radio link status.

34. The node according to claim 27, wherein the router is configured to use a combination of reactive and proactive ad hoc routing protocols.

35. The node according to claim 27, wherein said link status information comprises an energy status of nodes in the network.

36. The node according to claim 27, wherein said link status information comprises a number of NACK or ACK signals between nodes in the network.

37. The node according to claim 27, wherein said link status information comprises a number of bit errors between nodes in the network.

38. The node according to claim 27, wherein said link status information comprises information about ownership of nodes in the network.

39. An interlayer coordination system for use in a wireless communication network comprising:
  a first layer means comprises radio channel information acquiring means for acquiring radio channel information given by measurement of at least one of Doppler spread, coherence time, average fading duration, signal strength, or signal to interference noise ratio;
  a second layer means comprises link status information acquiring means for acquiring link status information between nodes; and
  a third layer means includes:
    link status monitoring means for obtaining radio channel and link status information from the first and second layers,
    route path determining means for using said link status information and calculated anticipation scenarios in a predictive procedure anticipating a near-future link status based on at least a fading parameter that indicates one of a slow fading category and a fast fading category, the anticipation scenarios being analyzed to determine said route path including using the acquired link status information and radio channel information in a comparison with determined routing anticipation criteria, and
    routing means for routing data via determined route path.

40. A method for efficient routing in a wireless network wherein data packets are routed using the following steps:
  providing link status information by measuring link status quality between infrastructure nodes in the network, the link status information including radio channel information given by measurement of at least one of Doppler spread, coherence time, average fading duration, signal strength, or signal to interference noise ratio;
  updating a routing element with said link status information;
  determining a route path using said link status information;
  routing said data packet via said determined route path; and
  upon detection of a routing failure of a data packet, retransmitting said data packet via a different route path determined using a predictive procedure using link status information of infrastructure nodes in the wireless network and calculated anticipation scenarios anticipating a near-future link status based on at least a fading parameter that indicates one of a slow fading category and a fast fading category, the anticipation scenarios being analyzed to determine said route path including using at least some of said link status information in a comparison with determined routing anticipation criteria.

41. A system for efficient routing in a multiple hop wireless communication network comprising a plurality of infrastructure nodes, the system comprising:
  means for acquiring link quality information indicating link status between said infrastructure nodes, said link quality information including radio channel information given by measurement of at least one of Doppler spread, coherence time, average fading duration, signal strength, or signal to interference noise ratio;
means for using said link quality information in a route path determination process in the infrastructure nodes using a predictive procedure;
said link quality information containing information about a time varying information of said link status; and
said predictive procedure uses said time varying information of link status and calculated anticipation scenarios in the predictive procedure anticipating a near-future link status based on at least a fading parameter that indicates one of a slow fading category and a fast fading category, wherein said predictive procedure uses at least some of said link quality information in a comparison with determined routing anticipation criteria; and
routing means for routing data packets according to a determined route path.

* * * * *